(12) United States Patent
Knee et al.

(10) Patent No.: US 9,532,053 B2
(45) Date of Patent: Dec. 27, 2016

(54) METHOD AND APPARATUS FOR ANALYSING AN ARRAY OF PIXEL-TO-PIXEL DISSIMILARITY VALUES BY COMBINING OUTPUTS OF PARTIAL FILTERS IN A NON-LINEAR OPERATION

(71) Applicant: Snell Limited, Berkshire (GB)

(72) Inventors: Michael James Knee, Petersfield (GB); Martin Weston, Petersfield (GB)

(73) Assignee: Snell Limited, Berkshire (GB)

( * ) Notice: Subject to any disclaimer, the term of this patent is extended or adjusted under 35 U.S.C. 154(b) by 410 days.

(21) Appl. No.: 13/832,764

(22) Filed: Mar. 15, 2013

(65) Prior Publication Data

US 2013/0265499 A1 Oct. 10, 2013

(30) Foreign Application Priority Data

Apr. 4, 2012 (GB) .................................. 1206065.3

(51) Int. Cl.
*H04N 7/26* (2006.01)
*H04N 19/80* (2014.01)
*H04N 19/513* (2014.01)

(52) U.S. Cl.
CPC ........ *H04N 19/0089* (2013.01); *H04N 19/521* (2014.11); *H04N 19/80* (2014.11)

(58) Field of Classification Search
CPC .................................................. H04N 19/0089
See application file for complete search history.

(56) References Cited

U.S. PATENT DOCUMENTS

| | | | | | |
|---|---|---|---|---|---|
| 5,329,317 | A | * | 7/1994 | Naimpally | H04N 19/85 348/607 |
| 5,479,926 | A | * | 1/1996 | Ustuner | G01S 7/52026 348/224.1 |
| 6,249,608 | B1 | * | 6/2001 | Ikeda | G06T 7/20 382/209 |
| 6,331,874 | B1 | * | 12/2001 | de Garrido | H04N 7/012 348/452 |
| 6,484,191 | B1 | * | 11/2002 | Alexandru | G06T 7/00 702/179 |

(Continued)

FOREIGN PATENT DOCUMENTS

| | | |
|---|---|---|
| GB | 2188510 | 9/1987 |
| GB | 2493396 | 2/2013 |
| WO | 2011/127961 | 10/2011 |

OTHER PUBLICATIONS

UK Search Report received in Application No. GB 1206065.3, dated Aug. 2, 2012. (1 page).

*Primary Examiner* — Jay Au Patel
*Assistant Examiner* — Irfan Habib
(74) *Attorney, Agent, or Firm* — Michael Best & Friedrich LLP

(57) ABSTRACT

In for example the assignment of motion vectors, an array of pixel-to-pixel dissimilarity values is analyzed to identify a pixel which has a low pixel-to-pixel dissimilarity value and which has neighboring pixels which have a low pixel-to-pixel dissimilarity value. The pixel-to-pixel dissimilarity values are filtered with a filter aperture decomposed into two or more sectors with partial filters applied respectively to each sector. Outputs of the partial filters are combining by a non-linear operation, for example taking the minimum from diametrically opposed sectors.

17 Claims, 5 Drawing Sheets

(56) References Cited

U.S. PATENT DOCUMENTS

| | | | | |
|---|---|---|---|---|
| 6,519,005 B2* | 2/2003 | Bakhmutsky | H04N 19/105 | 348/415.1 |
| 6,563,550 B1* | 5/2003 | Kahn | H04N 5/144 | 348/449 |
| 7,119,837 B2* | 10/2006 | Soupliotis | H04N 5/23248 | 348/208.99 |
| 7,149,364 B2* | 12/2006 | Umeda | G06T 5/20 | 382/260 |
| 7,388,987 B2* | 6/2008 | Chen | G06K 9/6202 | 382/195 |
| 7,787,048 B1* | 8/2010 | Vojkovich | H04N 7/012 | 348/448 |
| 7,990,471 B1* | 8/2011 | Otobe | H04N 7/0115 | 348/448 |
| 8,289,447 B1* | 10/2012 | Gowri-Shankar | H04N 7/0115 | 348/441 |
| 8,442,108 B2* | 5/2013 | Song | H04N 19/63 | 348/426.1 |
| 8,634,637 B2* | 1/2014 | Hirschmueller | G06T 7/0075 | 382/154 |
| 8,711,948 B2* | 4/2014 | Tu | H04N 19/30 | 375/240.13 |
| 8,861,617 B2* | 10/2014 | Chen | H04N 19/00103 | 375/240.01 |
| 8,867,825 B2* | 10/2014 | Ostermann | G06K 9/00986 | 382/154 |
| 8,953,673 B2* | 2/2015 | Tu | H04N 19/186 | 375/240 |
| 2003/0095205 A1* | 5/2003 | Orlick | H04N 7/012 | 348/448 |
| 2004/0017517 A1* | 1/2004 | Alvarez | G06T 7/2053 | 348/700 |
| 2004/0075764 A1* | 4/2004 | Law | H04N 7/012 | 348/448 |
| 2004/0105029 A1* | 6/2004 | Law | H04N 7/012 | 348/448 |
| 2005/0084012 A1* | 4/2005 | Hsu | H04N 19/52 | 375/240.12 |
| 2005/0243915 A1* | 11/2005 | Kwon | H04N 19/159 | 375/240.03 |
| 2006/0103659 A1* | 5/2006 | Karandikar | G06F 3/14 | 345/558 |
| 2006/0285724 A1* | 12/2006 | Tian | G06K 9/00335 | 382/103 |
| 2006/0290983 A1* | 12/2006 | Takeda | G06T 1/60 | 358/1.16 |
| 2007/0064815 A1* | 3/2007 | Alvarez | H04N 19/615 | 375/240.29 |
| 2007/0188607 A1* | 8/2007 | Jia | H04N 5/253 | 348/97 |
| 2008/0062309 A1* | 3/2008 | Zhai | G06T 3/4084 | 348/452 |
| 2009/0060373 A1* | 3/2009 | Perera | G06T 7/20 | 382/264 |
| 2009/0306505 A1* | 12/2009 | Yoshikawa | A61B 5/7475 | 600/443 |
| 2010/0027666 A1* | 2/2010 | Tetsukawa | H04N 19/56 | 375/240.16 |
| 2010/0322303 A1* | 12/2010 | Wada | H04N 19/176 | 375/240.01 |
| 2011/0243222 A1* | 10/2011 | Choi | H04N 19/159 | 375/240.03 |
| 2011/0274158 A1* | 11/2011 | Fu | H04N 19/115 | 375/240.02 |
| 2012/0300849 A1* | 11/2012 | Yasugi | H04N 19/61 | 375/240.16 |
| 2013/0034171 A1* | 2/2013 | Winken | H04N 19/597 | 375/240.25 |
| 2013/0070050 A1* | 3/2013 | Ha | H04N 5/144 | 348/43 |
| 2013/0222539 A1* | 8/2013 | Pahalawatta | H04N 13/0048 | 348/43 |
| 2014/0376634 A1* | 12/2014 | Guo | H04N 19/52 | 375/240.16 |

* cited by examiner

METHOD AND APPARATUS FOR ANALYSING AN ARRAY OF PIXEL-TO-PIXEL DISSIMILARITY VALUES BY COMBINING OUTPUTS OF PARTIAL FILTERS IN A NON-LINEAR OPERATION

FIELD OF INVENTION

This invention relates to video sequence processing particularly in connection with motion estimation of video signals.

BACKGROUND OF THE INVENTION

In the estimation of motion vectors between video frames, motion vectors are assigned to pixels, or blocks of pixels, in each frame and describe the estimated displacement of each pixel or block in a next frame or a previous frame in the sequence of frames. In the following description, the motion estimation is considered to be "dense" meaning that a motion vector is calculated for every pixel. The definition of "dense" may be widened to cover the calculation of a motion vector for each small block in the picture, for each pixel in a subsampled version of the picture, or for each small region of arbitrary shape within which the motion is expected to be uniform. The invention can be applied with trivial modification to these wider cases.

Motion estimation has application in many image and video processing tasks, including video compression, motion-compensated temporal interpolation for standards conversion or slow-motion synthesis, motion-compensated noise reduction, object tracking, image segmentation, and, in the form of displacement estimation, stereoscopic 3D analysis and view synthesis from multiple cameras.

Most applications of motion estimation involve the "projection" (also described as "shifting") of picture information forward or backward in time according to the motion vector that has been estimated. This is known as "motion-compensated" projection. The projection may be to the time instant of an existing frame or field, for example in compression, where a motion-compensated projection of a past or future frame to the current frame instant serves as a prediction of the current frame. Alternatively, the projection may be to a time instant not in the input sequence, for example in motion-compensated standards conversion, where information from a current frame is projected to an output time instant, where it will be used to build a motion-compensated interpolated output frame.

Some of the terminology used in describing motion estimation systems will now be described. FIG. 1 shows one-dimensional sections through two successive frames in a sequence of video frames. The horizontal axis of FIG. 1 represents time, and the vertical axis represents position. Of course, the skilled person will recognise that FIG. 1 is a simplification and that motion vectors used in image processing are generally two dimensional. The illustrated frames are: a previous or reference frame (101); and, the current frame (102). A motion vector (104) is shown assigned to a pixel (103) in the current frame. The motion vector indicates a point (105) in the reference frame which is the estimated source, in the reference frame, of the current frame pixel (103). This example shows a backward vector. Forward vectors may also be measured, in which case the reference frame is the next frame in the sequence rather than the previous frame.

The following descriptions assume that these frames are consecutive in the sequence, but the described processes are equally applicable in cases where there are intervening frames, for example in some compression algorithms. Temporal samples of an image will henceforth be referred to as fields, as would be the case when processing interlaced images. However, as the skilled person will appreciate, in non-interlaced image formats a temporal sample is represented by a frame; and, fields may be 'de-interlaced' to form frames within an image process. The spatial sampling of the image is not relevant to the discussion which follows.

An example of an algorithm that calculates motion vectors is disclosed in GB2188510. This algorithm is summarised in FIG. 2 and assigns a single vector to every pixel of a current field in a sequence of fields. The process of FIG. 2 is assumed to operate sequentially on the pixels of the current field; the pixel whose vector assignment is currently being determined will be referred to as the current pixel. The current field (202) and the previous field (201) are applied to a phase correlation unit (203) which calculates a "menu" (204) for every pixel of the current field consisting of a number (three in this example) of candidate motion vectors. Each candidate vector controls a respective member of a set of shift units (205) which, for every pixel in the current field, displaces the previous field (201) by the respective candidate vector to produce a shifted pixel corresponding to the current pixel of the current field in the respective member of the set of displaced fields (206).

A set of error calculation units (207) produces a set of error values (208), one error value for every menu vector for every pixel of the current field. Each of the error calculation units (207) subtracts the respective one of the displaced fields (206) from the current field (202) and rectifies the result to produce a field of difference magnitudes, which are known as displaced field differences or "DFDs". Each of the error calculation units (207) spatially filters its respective field of DFDs in a filter centred on the current pixel to give an error value for that pixel and menu vector. This spatially filtered DFD is the error value for the respective current pixel and vector. The set three error values (208) for the current pixel are compared in a comparison unit (209), which finds the minimum error value. The comparison unit (209) outputs a candidate index (210), which identifies the vector that gave rise to the minimum error value. The candidate index (210) is then applied to a vector selection unit (211) to select the identified candidate from the menu of vectors (204) as the respective output assigned vector (212) for the current pixel.

An important property of DFDs will now be described. If a candidate motion vector for a pixel describes the true motion of that pixel, then we would expect the DFD to be small, and only non-zero because of noise in the video sequence. If the candidate motion vector is incorrect, then the DFD may well be large, but it might be coincidentally small. For example, a rising waveform in one field may match a falling waveform in the displaced field at the point where they cross. Alternatively, a pixel may be in a plain area or in a one-dimensional edge, in which case several motion vectors would give rise to a small or even a zero DFD value. This inconvenient property of DFDs is sometimes referred to as the "aperture problem" and leads to the necessity of spatially filtering the DFDs in order to take information from nearby pixels into account in determining the error value for a pixel.

In the example of FIG. 2, each error calculation block (207) filters the DFDs with a two-dimensional filter, a typical example of which is a 5×5 running-average filter. It is this rectified and filtered error that is used for comparison of candidate motion vectors. FIG. 3 illustrates the positions of the 25 samples involved in the running-average filter. The 5×5 arrangement of 25 samples comprises the samples within the rectangular filter window (302) and is centred on the current pixel position (301).

Choosing the size of the two-dimensional DFD filter involves a trade-off between reliability and spatial accuracy of the resulting assigned motion vector field. If, on the one hand, the filter is large, then the effect of noise on the filtered error value is reduced and the filter is more likely to take into account nearby detail in the picture which might help to distinguish reliably between candidate motion vectors. However, a large filter is also more likely to take in pixel data from one or more objects whose motion is properly described by different motion vectors, in which case it will fail to give a low error value for any candidate motion vector, even for one that is correct for the pixel in question.

If, on the other hand, the filter is small, it is more likely to involve pixels from only one object and so is more likely to return a low error value for the correct motion vector. However, it will be less likely to reject wrong motion vectors and will be more susceptible to noise.

The inventors have observed that, for critical picture material, there is no choice of filter size which yields satisfactory performance in all aspects of reliability, noise immunity, spatial accuracy and sensitivity. However, the inventors have recognized that it is possible to design an improved displaced field difference filter which combines the reliability and noise immunity of a large conventional filter with the sensitivity and spatial accuracy of a small filter, while avoiding the disadvantages of each.

SUMMARY OF THE INVENTION

The invention consists of a method and apparatus for filtering displaced field differences arising from candidate motion vectors, characterised in that the filter window is decomposed into regions that are filtered separately and whose outputs are combined by a non-linear operation.

BRIEF DESCRIPTION OF THE DRAWINGS

An example of the invention will now be described with reference to the drawings in which.

DETAILED DESCRIPTION OF THE INVENTION

As explained in the introduction, a displaced field difference filter operates on a set of DFDs representing difference values, between current field pixels and respective displaced field pixels for a particular motion vector. Typically the difference values are rectified prior to filtering so that the magnitudes of the errors are represented by the DFDs. The filter takes contributions from the DFDs for a number of pixels within a filter window surrounding a current pixel; the DFD for the current pixel may also be used. Contributions from these DFDs are used to form an error value for the current pixel.

The input DFD values being filtered arise from a candidate motion vector, or from a smoothly varying motion vector field, calculated by known methods. In the description that follows, the term "motion vector" refers either to a constant vector over a region or to a smoothly varying vector field.

Displaced field difference filters according to examples of the invention will now be described. In each case the filter output is an error value for a particular motion vector at a particular pixel position within a current field, this pixel position will be referred to as the current pixel. The filter input DFD values will be referred to as samples, and the DFD corresponding to the current pixel will be described as the current sample. The positions of samples correspond with the positions of the respective current field pixels used to calculate the respective DFDs.

Figure 1:
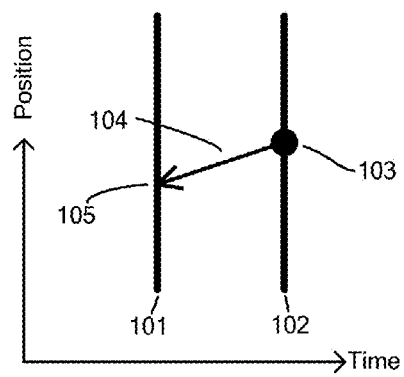
FIG. 1 is a diagram showing current and previous frames in an image sequence and a backward motion vector extending from a pixel in the current frame.
Figure 2:
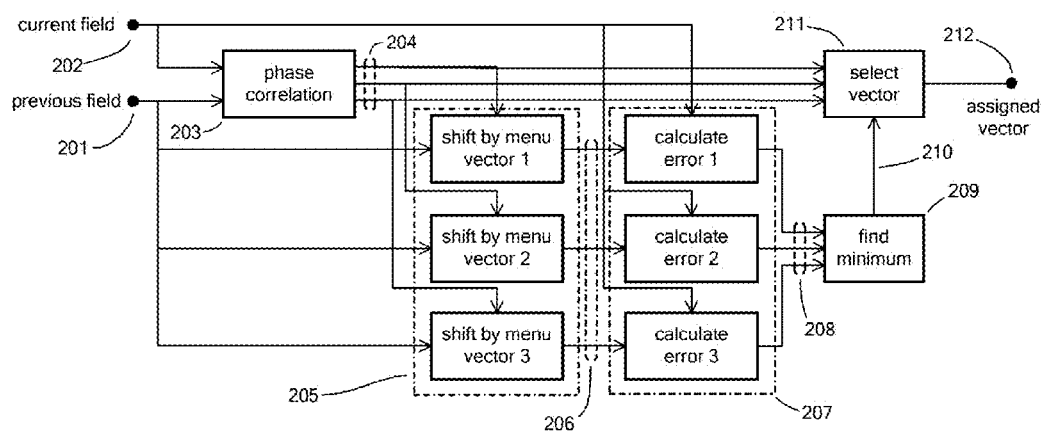
FIG. 2 is a block diagram of apparatus for assigning backward motion vectors to pixels according to the prior art.
Figure 3:
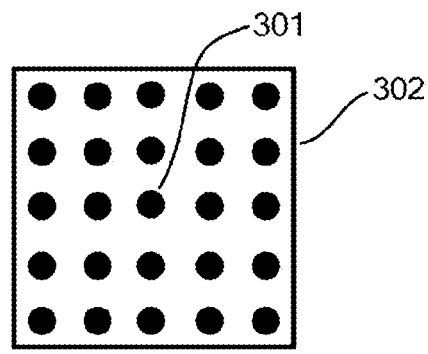
FIG. 3 is a diagram of a filter window according to the prior art.
Figure 4:
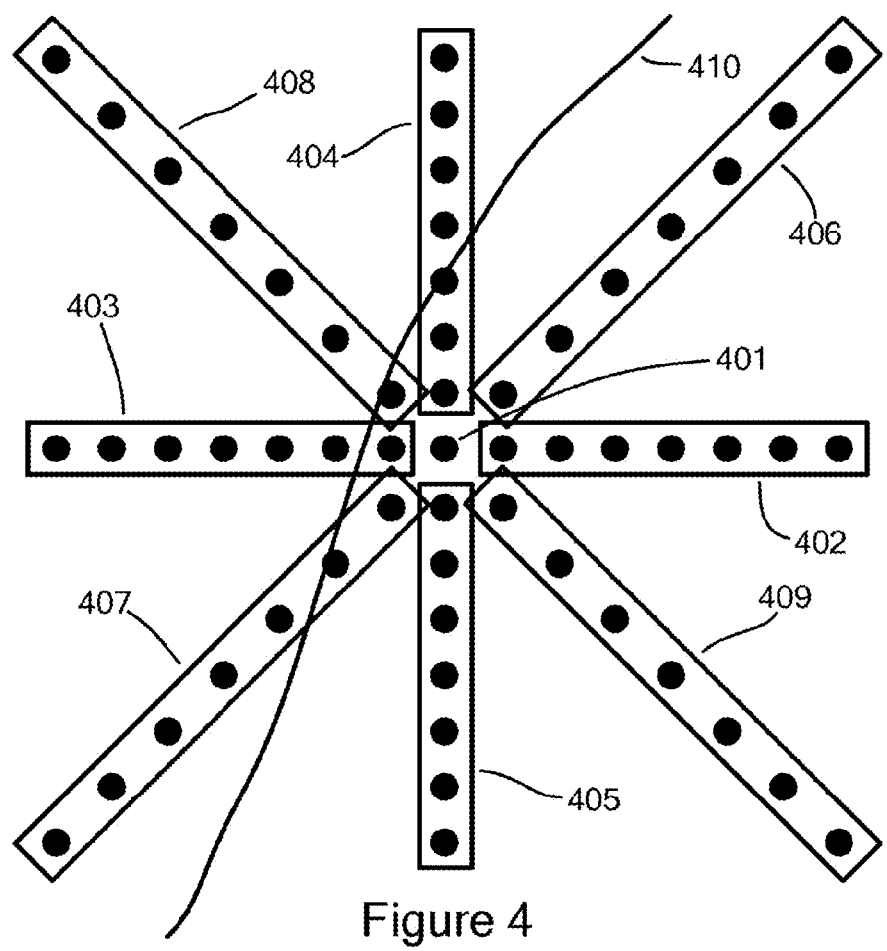
FIG. 4 is a diagram of a set of filter windows according to a first embodiment of the invention.

The filter window of a first exemplary embodiment of the invention is illustrated in FIG. 4, to which reference is now directed. The filter is given access to a number of contributing samples surrounding the current sample (401). Only samples that are used by the filter are shown in FIG. 4; other samples in the vicinity of the current sample are not shown, typically there will be intermediate, unused samples forming part of an orthogonal spatial sampling structure for the current field. The contributing samples are grouped into eight line segments (402 to 409) in a star pattern centred on the current sample (401). The choice of this pattern is a compromise between economy and ease of access to samples in a hardware implementation, and the need to cover a reasonably wide area surrounding the current sample. In this particular example, each line segment contains seven samples, though other sizes are possible without departing from the scope of the invention.

The object of the filter is to give a high output if the motion vector that gave rise to the contributing samples is the wrong motion vector for the position of the current sample (401), and to give a low output if the motion vector is correct. If we begin with the assumption that the validity or invalidity of a motion vector extends across the area covered by the star pattern, then a high sample value somewhere in the pattern constitutes evidence that the motion vector is incorrect, and a suitable nonlinear filtering operation would be to take the maximum of the sample values across the pattern. However, it is quite possible that a boundary between two differently moving objects, for example the line shown (410) will cross the area. In this case, if the motion vector that gave rise to the sample is the one describing the motion of the right-hand object, we would expect the samples to the right of the line to have low values and those to the left to have at least some high values. We observe that, if the eight line segments in the star pattern are grouped into pairs of diametrically opposite segments (402 with 403; 404 with 405; 406 with 407; and, 408 with 409) then one segment of each pair will be expected to contain low sample values. The operation of the first inventive filter is therefore to take maximum values in each line segment, and then to take the minimum of the two maxima within each pair. This operation produces four values, all of which we expect to be low if the motion vector is correct. A further operation of the filter is therefore to take the maximum of the four minima. Finally, it is important for spatial accuracy to take account of the current sample. This is done by combining its value with the output of the filter so far defined, for example by taking the mean square value.

An alternative description of the first exemplary inventive filter will now be given with reference to the block diagram in FIG. 5. The filter receives an input stream of samples (500) corresponding to the DFDs for a current field and a particular motion vector. The samples are ordered according to a scanning raster so that when they are passed through a chain of delay elements (510) suitable choices for the delay values give access to the 57 (in this example) samples at the locations shown in the star pattern of FIG. 4. The output of the delay chain (510) takes the form of eight sets (502 to 509) of seven samples each, where output (502) corresponds to line segment (402), output (503) to line segment (403), and so on, together with the central sample (501), corresponding to current sample (401)). The maximum value of each of the eight sets is found in respective maximum-value calculation units (512) to (519). The resulting maximum values (522) to (529) are applied in pairs to minimum-value calculation units (532), (534), (536) and (538) so as to find the respective minimum values from diametrically-opposite filter window segments. The resulting minimum values (542), (544), (546) and (548) are applied to a maximum-value calculation unit (550) whose output (551) is combined (553) with the current sample (501) by taking the root-mean-square value, which form the filtered DFD output (554).

Possible variations of this filter will now be described. In a first variation, the eight maximum-value calculation units (512) to (519) are replaced by eight averaging units. This variation can improve the noise immunity of the filter. In a second variation, the subsequent maximum-value unit (550) is likewise replaced by an averaging unit.

It will be apparent to the skilled person that other choices of processing elements may also be used. For example, units (512) to (519) may calculate: a mean square value; a combination of the mean and the maximum; or, other rank-order values such as the second or third highest value. Similarly, unit (550) may also take: a mean square value; a combination of the mean and the maximum; or, the second highest value. Such decisions are a trade-off between robustness to noise and sensitivity to data, and between reliability and the capability of handling motion vector boundaries that are more complex in shape.

Figure 6:
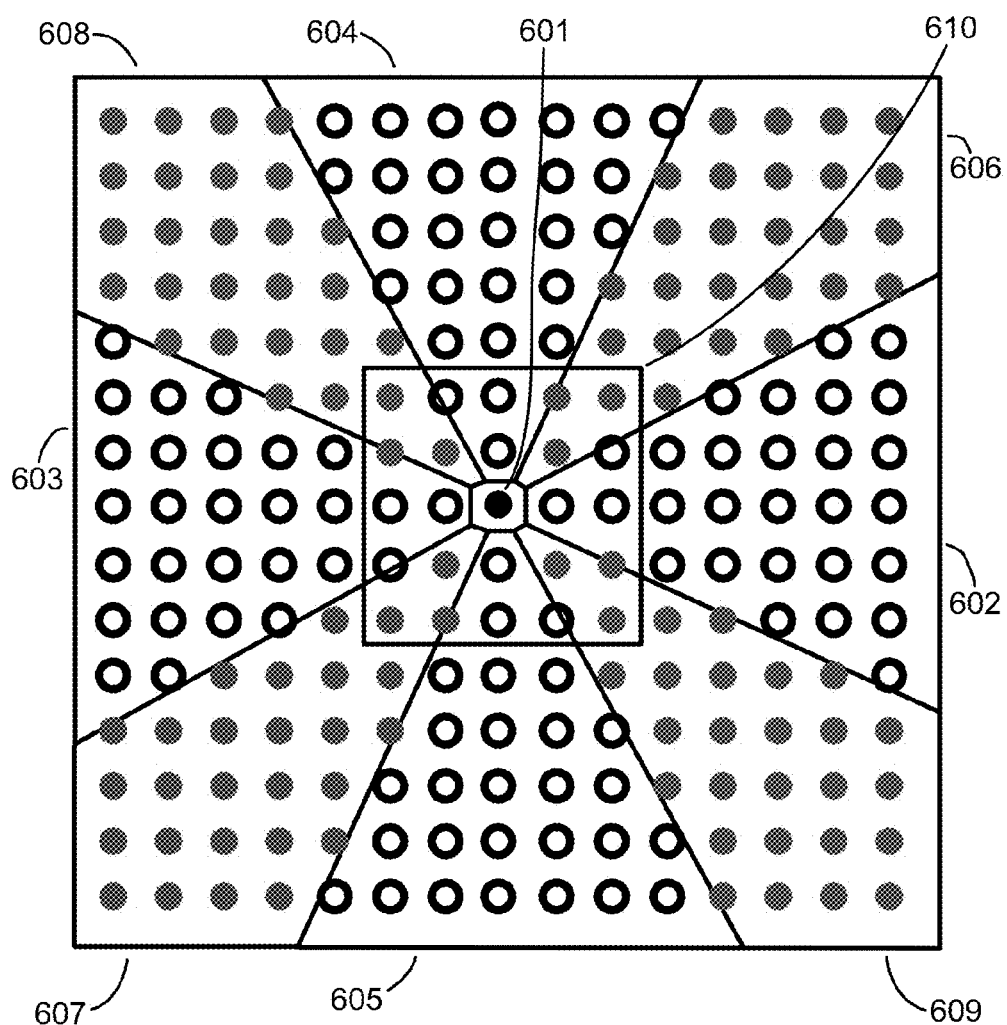
FIG. 6 is a diagram of a set of filter windows according to a second embodiment of the invention.

A displaced field difference filter according to a second exemplary embodiment of the invention will now be described. The second filter is more reliable than those previously described, at the cost of an increase in complexity. FIG. 6 shows the samples involved in the second filter, based on an example window size of 15×15. In place of the eight 7-sample line segments shown in FIG. 4, this filter has eight octants (602) to (609) each containing 28 samples. (In FIG. 6 the sample positions in alternate octants are indicated by open circles so as to indicate more clearly the allocation of samples to octants.) The average value of the samples within each octant is taken, and subsequent processing may be the same as that of the first filter.

Figure 5:
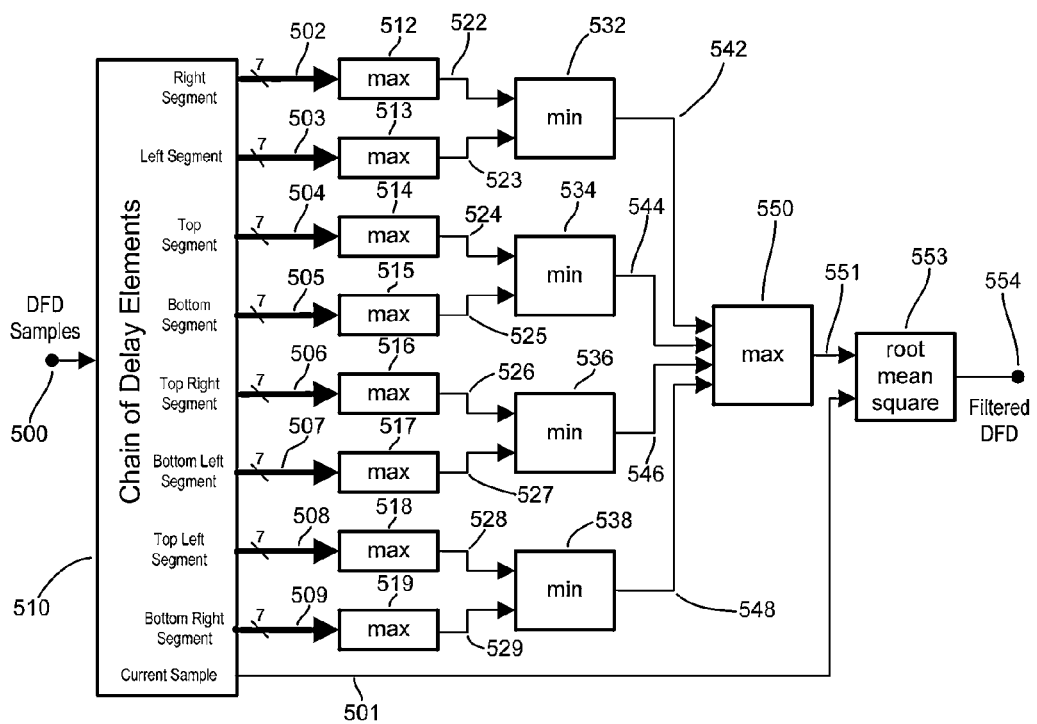
FIG. 5 is a block diagram of an improved filter according to a first embodiment of the invention.

Preferably however, the final combining step, (553) of FIG. 5, may be replaced by a linear combination of the output of the four-value mean (550 in FIG. 5) with the output of a conventional 5×5 running average filter whose window (610) is also shown in FIG. 6.

The architecture of the second filter may be based on FIG. 5, with the output of delay chain (510) now consisting of eight sets of 28 samples. However, a more efficient implementation is as shown in FIG. 7, where the chain of delay elements and the mean-value calculations at its output are replaced by octant-shaped running-average filters which may be constructed, for example, as described in UK patent application 1113569.6, with additional simplifications that exploit the fact that the octants have shared boundaries.

Figure 7:
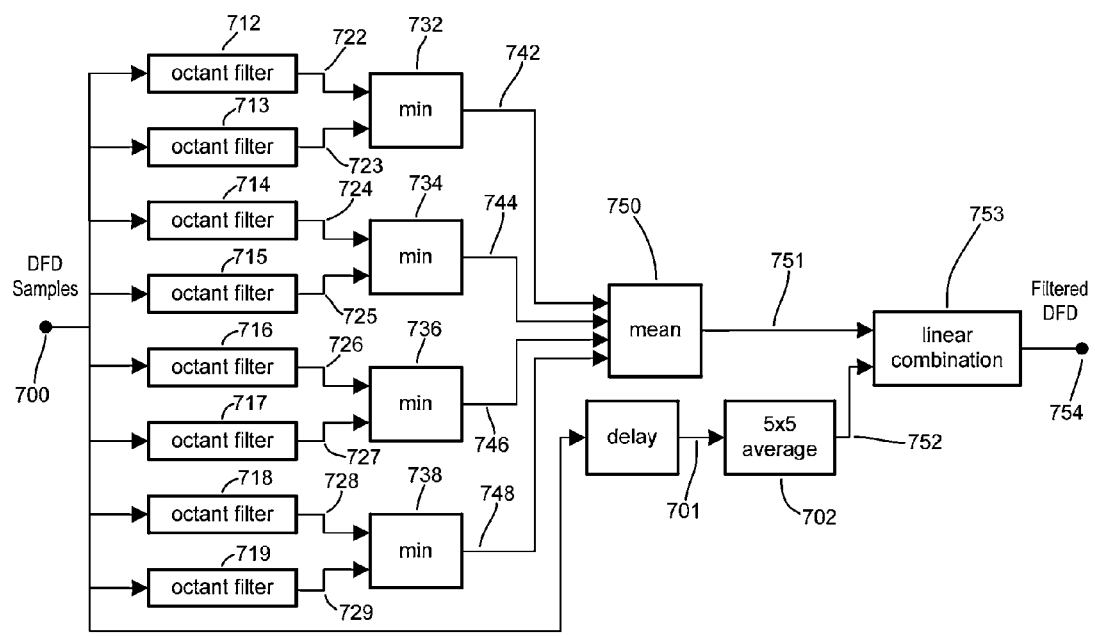
FIG. 7 is a block diagram of an improved filter according to a second embodiment of the invention.

Referring to FIG. 7, the input stream of samples (700) is applied to eight octant-shaped running-average filters (712) to (719) whose outputs (722) to (729) are applied in pairs to minimum-value calculation units (732), (734), (736) and (738) so as to find the respective minimum values from diametrically-opposite filter window segments. The resulting minimum values (742), (744), (746) and (748) are applied to an averaging unit (750) whose output (751) is linearly combined (753) with the output (752) of a 5×5 running-average filter (702) applied to a suitably delayed version (701) of the input (700), to produce a final filtered DFD output (754). A typical linear combination in block (753) is to add 75% of the output (751) of the averaging unit (750) to 25% of the output (752) of the 5×5 running-average filter (702).

The invention so far described involves filter windows of particular sizes and shapes. It will be apparent to the skilled person that other sizes and shapes may be chosen without departing from the scope of the invention. For example, the line segments of the star pattern in FIG. 4 may contain fewer or more than the seven samples shown. The pattern may also have fewer or more than the eight line segments shown. Likewise, the square window shown in FIG. 6 may be smaller or larger than the 15×15 window shown, and the eight octants may be replaced by suitable numbers of other shapes, for example four quadrants or sixteen sedecants. The window need not be square: for example, windows that are polygonal with other than four sides, or that are approximately circular, may also be used. It is also possible to combine error value samples from overlapping segments of the filter window without departing from the scope of the invention.

The above description is based on displaced field differences. Other measures of pixel-to-pixel dissimilarity may also be used, including but not limited to: nonlinear functions of displaced field difference, displaced field differences between noise-reduced fields, Euclidean or other distances between multidimensional signals, for example RGB signals, and differences between feature point descriptors.

The implementations of the filters have been described in terms of serial processing of streams of values, typically ordered according to a scanning raster. Of course the skilled person will appreciate that many other implementations of the inventive filters are possible, including, for example, the use of random-access field or frame stores or programmable apparatus. And, as explained in the introduction, filtering according to the invention may be applied to measures of dissimilarity between subsamples or regions of an image.

Although motion-compensated processing of images is typically applied to a time sequence of images where the sequence of images is a time sequence, the same process may be used with spatial image sequences, where the sequence is a sequence of different views of a common scene, or a sequence of different views captured in a time sequence. The current invention is equally applicable to the processing of these other types of image sequence. The invention may also be applied where the pixel to pixel dissimilarity values are derived not from motion or other comparison of different images but by comparing different regions of the same image, for example to test a prediction. Motion compensation may itself be regarded as a form of prediction so the term predictor may be used here to include a motion vector; a displacement from one region of an image to another image; as well as other forms of predictor.

The invention claimed is:

1. In a video processor, a method of analysing an array of pixel-to-pixel dissimilarity values to identify a pixel which has a low pixel-to-pixel dissimilarity value and which has neighbouring pixels which have a low pixel-to-pixel dissimilarity value; the method comprising the steps of:
   receiving an array of pixel-to-pixel dissimilarity values, each pixel-to-pixel dissimilarity value representing a difference between the value of a pixel in a first spatial pixel array representing a first image and the value of a corresponding pixel in a second spatial pixel array representing a second image;
   providing a filter having a filter aperture which defines those pixel-to-pixel dissimilarity values on which the filter operates and which is decomposed into two or more filter windows which define respective subsets of those pixel-to-pixel dissimilarity values on which the filter operates, wherein said filter comprises a plurality of partial filters applied respectively to the windows of the filter aperture;
   filtering the pixel-to-pixel dissimilarity values in each filter window with the respective partial filter to provide an output for each partial filter; and
   combining the respective outputs of said partial filters by a non-linear operation, in which the non-linear combination process includes taking minimum values of partial-filter outputs from pairs of filter windows that are diametrically opposite each other in the filter aperture.

2. A method according to claim 1 in which each dissimilarity value is a rectified field difference between fields displaced through motion compensation.

3. A method according to claim 1 in which the partial filters operate on radial line segments.

4. A method according to claim 1 in which the partial filters operate on sectors of a circle in the filter aperture.

5. A method according to claim 1 in which the partial filtering operation is a rank-order operation.

6. A method according to claim 1 in which the partial filtering operation is an averaging operation.

7. A method according to claim 1 in which the minimum values from said pairs of filter windows are processed by a rank-order operation.

8. A method according to claim 1 in which the minimum values from said pairs of filter windows are processed by an averaging operation.

9. Video sequence processing apparatus for analysing motion-compensated pixel-to-pixel dissimilarity values, the apparatus comprising
   a spatial filter configured to operate on motion-compensated pixel-to-pixel dissimilarity values in which the filter aperture which defines those values on which the filter operates is decomposed into two or more filter windows which define respective subsets of those pixel-to-pixel dissimilarity values on which the filter operates and the filter comprises a plurality of partial filters applied respectively to each filter window; and
   a combiner for combining the respective outputs of said partial filters by a non-linear operation in which the combiner operates to take minimum values of partial-filter outputs from pairs of filter windows that are diametrically opposite each other in the filter aperture.

10. Apparatus according to claim 9 in which the partial filters operate on sectors a circle in of the filter aperture.

11. Apparatus according to claim 9 in which the partial filtering operation is a rank-order operation.

12. Apparatus according to claim 9 in which the partial filtering operation is an averaging operation.

13. Apparatus according to claim 9 in which the minimum values from said pairs of filter windows are processed by a rank-order operation.

14. Apparatus according to claim 9 in which the minimum values from said pairs of filter windows are processed by an averaging operation.

15. A method of video processing in a video processor, comprising the steps of:
   deriving a candidate predictor representing a displacement between first and second image regions of the video sequence, each image being formed of pixels;
   using the predictor to project from the first image region to the second image region a current pixel and a plurality of pixels neighbouring the current pixel;
   providing for each pixel a dissimilarity value indicative of the dissimilarity between the pixel in the second image and the pixel projected from the first image; and
   analysing the plurality of dissimilarity values to derive an error value for the candidate predictor;
   wherein the step of analysing the plurality of dissimilarity values comprises:
   dividing the pixels neighbouring the current pixel into at least two diametrically disposed sectors:
   deriving a high error value for the predictor when the pixels in all sectors have high dissimilarity values; and
   deriving a low error value for the predictor when the current pixel and the pixels of at least one sector have low dissimilarity values.

16. A non-transitory computer program product adapted to cause programmable apparatus to implement a method of analysing an array of pixel-to-pixel dissimilarity values to identify a pixel which has a low pixel-to-pixel dissimilarity value and which has neighbouring pixels which have a low pixel-to-pixel dissimilarity value; the method comprising the steps of filtering the pixel-to-pixel dissimilarity values with a filter having a filter aperture which defines those pixel-to-pixel dissimilarity values on which the filter operates decomposed into two or more filter windows which define respective subsets of those pixel-to-pixel dissimilarity values on which the filter operates with a plurality of partial filters applied respectively to each filter window; and combining the outputs of said partial filters by a non-linear operation in which the non-linear combination process includes taking minimum values of partial-filter outputs from pairs of filter windows that are diametrically opposite each other in the filter aperture.

17. A non-transitory computer program product according to claim 16, wherein the two or more regions comprise sectors a circle.

* * * * *